US011690100B2

(12) United States Patent
Jones et al.

(10) Patent No.: US 11,690,100 B2
(45) Date of Patent: Jun. 27, 2023

(54) MULTI-BAND RADIO ALLOCATION FOR MOBILE NETWORKS

(71) Applicant: T-Mobile USA, Inc., Bellevue, WA (US)

(72) Inventors: David Jones, Bellevue, WA (US); Ahmad Armand, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/533,520

(22) Filed: Nov. 23, 2021

(65) Prior Publication Data

US 2022/0086905 A1  Mar. 17, 2022

Related U.S. Application Data

(63) Continuation of application No. 16/576,478, filed on Sep. 19, 2019, now Pat. No. 11,212,834.

(51) Int. Cl.
*H04W 74/08* (2009.01)
*H04B 17/318* (2015.01)
(Continued)

(52) U.S. Cl.
CPC ...... *H04W 74/0808* (2013.01); *H04B 17/318* (2015.01); *H04W 24/02* (2013.01); *H04W 28/0284* (2013.01); *H04W 48/16* (2013.01); *H04W 48/18* (2013.01); *H04W 72/0453* (2013.01); *H04W 72/542* (2023.01); *H04W 76/15* (2018.02)

(58) Field of Classification Search
None
See application file for complete search history.

(56) References Cited

U.S. PATENT DOCUMENTS 10,548,071 B2  1/2020  Maaref et al.
10,912,147 B1  2/2021  Gundavelli et al.
(Continued)

FOREIGN PATENT DOCUMENTS

WO  WO-2020160974 A1 * 8/2020 ........... G06N 3/0445

OTHER PUBLICATIONS

Office Action for U.S. Appl. No. 16/576,478, dated Apr. 6, 2021, Jones, "Multi-Band Radio Allocation for Mobile Networks", 8 Pages.

*Primary Examiner* — Anh Ngoc M Nguyen
(74) *Attorney, Agent, or Firm* — Lee & Hayes, P.C.

(57) ABSTRACT

This disclosure is directed to allocation of one or more radio bands to a user equipment (UE) for establishing a radio link with a radio node (e.g., eNodeB or gNodeB). The radio bands may include a shared band, such as citizens band radio service (CBRS), a primary licensed band, such as the B66 band, and/or an unlicensed band, such as B46 band. A radio communications system may consider a variety of parameters associated with the distance of a UE from a radio node, signal strength of a signal from the UE, the services requested by the UE, and/or spectral availability of the each of the radio bands to determine which radio band(s) to allocate to the UE. In some cases, the radio band allocated to a UE may be dynamically changed by the radio communications system as conditions related to the UE and/or the mobile network change.

20 Claims, 9 Drawing Sheets

(51) Int. Cl.

| | |
|---|---|
| *H04W 24/02* | (2009.01) |
| *H04W 72/0453* | (2023.01) |
| *H04W 48/18* | (2009.01) |
| *H04W 76/15* | (2018.01) |
| *H04W 48/16* | (2009.01) |
| *H04W 28/02* | (2009.01) |
| *H04W 72/542* | (2023.01) |

(56) References Cited

U.S. PATENT DOCUMENTS

| | | |
|---|---|---|
| 2002/0075895 A1 | 6/2002 | Yamaguchi et al. |
| 2009/0017824 A1 | 1/2009 | Lee et al. |
| 2015/0163692 A1 | 6/2015 | Babaei |
| 2016/0174233 A1 | 6/2016 | Emmanuel et al. |
| 2016/0366031 A1* | 12/2016 | Xu .......................... H04B 1/56 |
| 2017/0070935 A1 | 3/2017 | Karimli et al. |
| 2017/0135104 A1* | 5/2017 | Emmanuel .......... H04L 43/0888 |
| 2020/0107210 A1* | 4/2020 | Wu ....................... H04W 16/16 |
| 2021/0068012 A1* | 3/2021 | Kim ...................... H04W 48/20 |
| 2021/0092767 A1 | 3/2021 | Jones et al. |
| 2021/0274377 A1* | 9/2021 | Lee ......................... H04L 5/001 |

\* cited by examiner

MULTI-BAND RADIO ALLOCATION FOR MOBILE NETWORKS

CROSS REFERENCE TO RELATED APPLICATIONS

The present disclosure is a continuation of, and claims priority under 35 U.S.C. § 120 to, U.S. patent application Ser. No. 16/576,478 filed Sep. 19, 2019, the entire disclosure of which is hereby incorporated by reference in its entirety.

BACKGROUND

With the proliferation of personal electronic devices, such as smartphones, tablet computers, and desktop computers, that connect to mobile networks, there is demand for radio spectrum to allow a high density of the personal electronic devices to connect to cells of the mobile networks. Often times, licensed radio spectrum used by a mobile network operator (MNO) may be expensive and insufficient to service a large number of personal electronic devices at the same time. Although unlicensed and/or semi-licensed spectrum may be available for communicative links between a personal electronic device and a cell infrastructure (e.g., eNodeB, gNodeB, etc.), these alternate radio bands may not be used uniformly and/or for all types of voice and/or data services.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
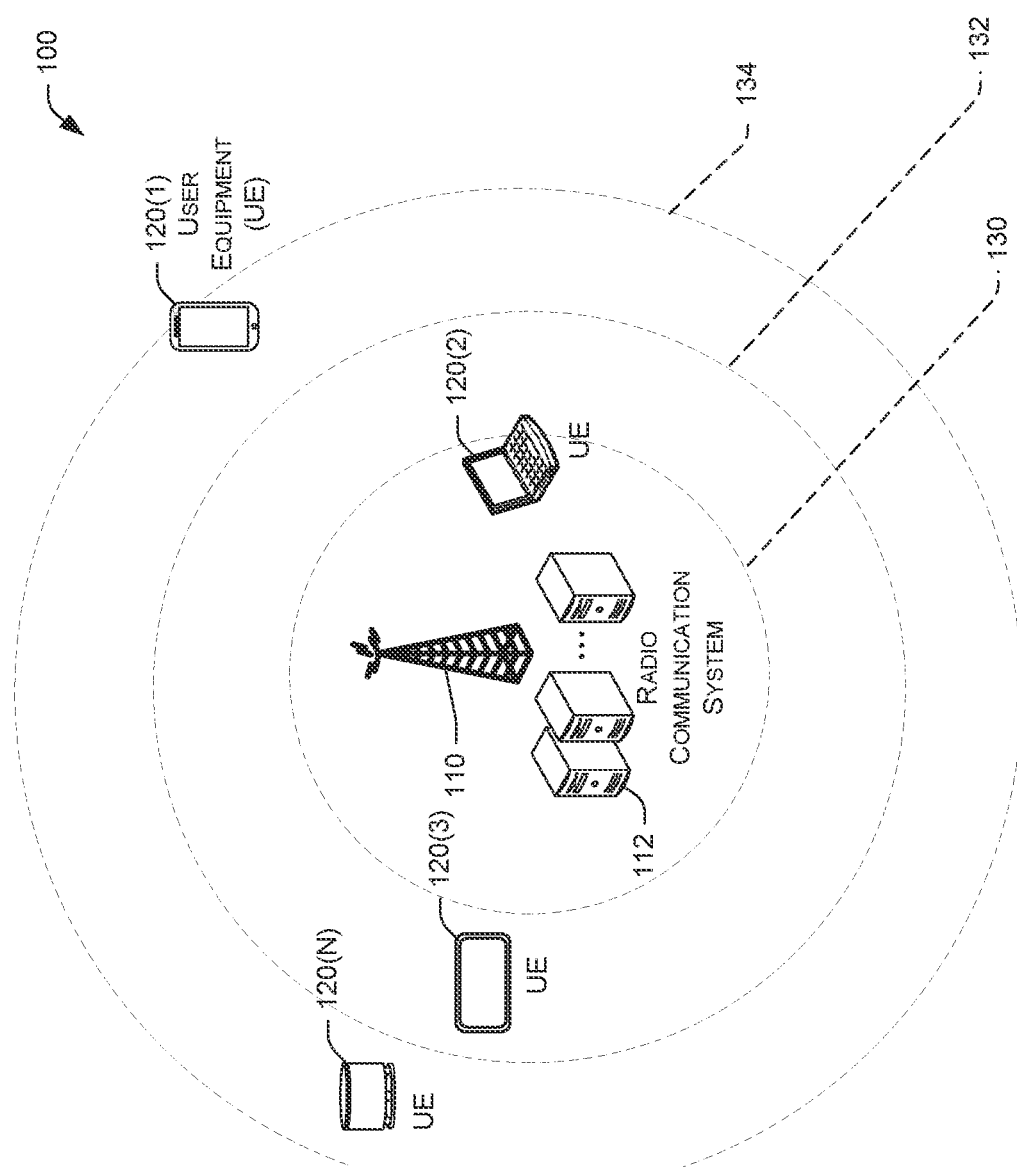
FIG. 1 illustrates a schematic diagram of an example environment with mobile network cell infrastructure including a radio node and a radio communications system to which one or more user equipment (UE) may connect via a radio link, in accordance with example embodiments of the disclosure.

Example embodiments of this disclosure describes methods, apparatuses, computer-readable media, and systems for allocating a user equipment (UE) that is to communicate via a radio link with a mobile network cellular infrastructure, such as an eNodeB and/or a gNodeB, to one or more radio bands. The radio link that is established over one or more of the radio bands may enable a relatively higher level of data and/or control links between the UE and entities of a mobile network to which the mobile network cell infrastructure belongs. For example, protocol based data and control communications, such as session initiation protocol (SIP) messages and/or message session relay protocol (MSRP) messages, may be carried over the established radio links, according to example embodiments of the disclosure. The disclosure herein may enable the selection, from multiple radio bands, of which band(s) to use to establish radio links with particular UEs to effectively manage available radio bandwidth across all of the multiple radio bands.

The eNodeB or gNodeB, in the form of a small cell and/or a macro-cell, and the processors and logic therein, may consider various parameters, such as spectrum availability, required quality of service, distance between the UE and the eNodeB/gNodeB, and/or signal strength to select and/or dynamically switch between various radio bands. The allocation of various UEs to particular radio band(s) for uplink and/or downlink may increase the number of UEs with which a particular mobile network cell can establish radio links and/or reduce the cost of providing mobile telephony/communications/data services.

In example embodiments, an unlicensed/semi-licensed radio band may be incorporated as one of the radio bands on which a radio link to a UE may be established. This radio band may be band 48 (B48), also referred to as Citizens Broadband Radio Service (CBRS). In some cases, the CBRS band may have a width of approximately 150 MHz between 3.55-3.7 GHz, with 40 MHz channels and time division duplex (TDD) that can be used for communications between a UE and a radio node (e.g., eNodeB or gNodeB). Alternatively, the B48 band may have other channel widths, such as 10 MHz, 20 MHz, 30 MHz, etc. The CBRS band may be used for uplink, downlink, or both uplink and downlink communications.

In example embodiments, the various radio bands may further include an unlicensed B46 band. The B46 band may have a width of 775 MHz between 5.15-5.925 GHz, with 60 MHz channels. Alternatively, the B46 band may have other channel widths, such as 10 MHz, 20 MHz, 50 MHz, etc. In example embodiments, the B46 band may be used as a supplementary downlink (SDL) channel, where the B46 band may be used only for downlink traffic to the UE, rather than uplink traffic from the UE. In other alternative embodiments, the B46 band may be used for both uplink and downlink traffic.

Additionally, the multiple radio bands may include a primary band, such as licensed band that may be used to establish highly reliable radio connections between the eNodeB/gNodeB and a UE. In example embodiments, the primary, licensed band may be band B66. The B66 band may have a range of 1.71-1.78 GHz for uplink traffic and 2.11-2.2 GHz for downlink traffic, with 20 MHz channels and frequency division duplex (FDD). Although specific radio bands are discussed here, the disclosure herein contemplates other radio bands not explicitly stated herein, according to example embodiments. For example, other bands that may be allocated to UEs for radio communications may include, but are not limited to, band 71 (within a range of 617-652 MHz and/or 663-698 MHz), and various millimeter-wave bands such as, band 257 (within a range of 26.50-29.50 GHz), band 258 (within a range of 24.25-27.5 GHz), band 261 (within a range of 27.5-28.3 GHz), and/or band 260 (within a range of 37-40 GHz). Millimeter-wave bands support 50 MHz, 100 MHz, 200 MHz, and 400 MHz channel bandwidths. The allocation of the various available radio bands (e.g., B66, B46, B48, etc.) to individual ones of the UEs may be based on a variety of factors, as discussed herein, to enable a greater density of UEs to be serviced from the mobile network cellular infrastructure with a high level of mobile service quality and data throughput.

In general, the primary band, such as B66 band, may be a highly reliable radio band that may provide a relatively greater quality of service (QoS) compared to other radio bands, such as B46 and/or CBRS radio bands. Additionally, in example embodiments, the primary band may be reliably used throughout the full spatial range of a mobile network cell, such as all the way to the cell edge, while other radio bands, such as CBRS and/or B48 may not provide reliable signal strength all the way to the edge of the cell. Further still, in some cases, the primary band may be more predictably available, while B46 and/or CBRS radio bands may be afflicted with congestion that is not under the control of the mobile network operator. For example, the CBRS band is prioritized for military use. Thus, the CBRS band may not be available or may be subject to limited availability if it is being used by prioritized entities, such as the military.

As disclosed herein, a radio communications system providing adaptive scheduling services for the eNodeB/gNodeB may allocate voice, short message service (SMS) communications, and/or data service for one or more UEs to one or more of the primary band (e.g., B66), the unlicensed B46 band, and/or the CBRS. According to example embodiments, other radio bands may be included instead of and/or in addition to the radio bands discussed herein, for example in a carrier aggregation configuration for the purposes of establishing a radio link between mobile network cell infrastructure and one or more UEs. Allocation of a particular UE to a particular downlink radio band and/or a particular uplink radio band may be based at least in part on a variety of factors, according to example embodiments of the disclosure. These factors may include, for example, required QoS of communications services rendered, the distance of the UE from a center of the cell and/or from the cell antenna(s), signal strength between the UE and the eNodeB/gNodeB using the various radio bands, spectrum congestion of the various radio bands, availability of radio band bandwidth, etc.

As an example, to ensure high QoS for voice and/or SMS, such as contractually obligated QoS levels, UEs using these services may be allocated to the B66 primary band. On the other hand, other services, such as media streaming, may be allocated to B46, which may not provide as high of a QoS as B66, but may be particularly suited for download-centric services that may benefit from relatively high download speeds. As another example, UEs that are spatially close to the eNodeB/gNodeB (e.g., near cell) may be allocated to use the shorter range unlicensed spectra (e.g., B46), while UEs that are mid-distance from the eNodeB/gNodeB (e.g., mid cell) may be allocated to the CBRS spectra, and UEs that are of greater distance from the eNodeB/gNodeB (e.g., cell edge) may be allocated to the primary spectra (e.g., B66). As yet another example, signal strength as measured on signals received from a UE may be used to allocate that UE to a particular radio band. For example, if the signal strength is relatively high, then the UE may be allocated to the B46 band for downlink, and if the signal strength is neither strong nor weak, the UE may be allocated to the CBRS band, and if the signal strength is weak, the UE may be allocated to the B66 radio band.

Other consideration for the allocation of spectral radio bands to individual UEs by the adaptive scheduler may include spectral congestion, spectral use by other entities, such as prioritized military (e.g., Department of Defense (DoD)) use of CBRS spectra, load balancing, congestion balancing across usable bands, uplink/downlink balancing, etc. In this way, the adaptive scheduler may dynamically allocate radio traffic to available radio bands in a manner that optimizes the use of the available bandwidth across multiple bands of a cell. This not only enhances user experience and network availability, but may also reduce cost by shifting radio traffic, when possible, away from more expensive licensed spectra to more cost-effective unlicensed, semi-licensed, and/or shared bands.

It should be appreciated that the mechanisms, as disclosed herein, may provide the ability for mobile network operators to provide services to a greater number of customers within a particular mobile network cell. In this way, existing infrastructure may be used, in a cost-effective manner, for handling a greater volume of mobile network services and density of UEs than would be possible without the mechanisms disclosed herein. Additionally, lower-cost resources, such as unlicensed and/or semi-licensed spectrum, may be deployed for the purposes of increasing the spatial concentration of mobile network services and UEs to which those mobile network services are provided.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with mobile network cell infrastructure including a radio node 110 and a radio communications system 112 to which one or more user equipment (UE) 120(1), 120(2), ..., 120(N) may connect via a radio link, in accordance with example embodiments of the disclosure.

The UE(s) 120(1), 120(2), 120(3), ..., 120(N), hereinafter referred to individually or in plurality as UE 120 or UEs 120, may be any suitable client device or mobile network communication device. The UEs 120 may be associated with (e.g., belong to) user(s) who may be able to interact with the UEs 120 to initiate and/or engage in a communication session via a mobile communications network that may be associated with and/or include the radio node 110. The UE 120 may be able to interact, such as via one or more handshaking protocols, to establish a radio link with the radio node 110 in accordance with the mechanisms disclosed herein. Once the radio link is established between the UE 120 and the radio node 110, mobile communications may be enabled via the established radio link. In other words, the established radio link may operate as a conduit for providing data, voice, SMS, A/V calls, rich communications services (RCS), and/or other mobile communications services to the UE 120. Thus, once the radio link is established between the UE 120 and the radio node 110, a user associated with the UE 120 may be able to access data, voice, SMS, A/V calls, RCS, and/or other mobile communications services via his or her UE 120.

Although the UEs 120 are depicted as a smartphone 120(1), a laptop computer 120(2), a tablet computer 120(3), and a voice device 120(N), it will be appreciated that the UEs 120 may be any suitable UE 120 that can make, receive, and/or transfer communications sessions, such as data, voice, SMS, A/V calls, RCS. UEs 120 may include, but are not limited to, televisions, set-top boxes, computers, computing devices, servers, notebook computers, netbook computers, personal digital assistants (PDAs), smartphones, telephones, tablets, in-vehicle infotainment systems (IVIs), Internet of Things (IoT) devices, combinations thereof, or the like.

The UEs 120 may have a communications application and/or software installed thereon that allows the UEs 120 to interact with users to conduct the communications session. The UE 120 may be configured to identify that a user requests communications services, such as via interaction with the user, and may cooperate with the radio node 110 and/or the radio communications system 112 to establish a radio link over which user requested communications services may be provided.

The radio node 110 may be any suitable node such as, but not limited to, eNodeB and/or gNodeB. The radio node 110 may include antennas that may transmit and/or receive signals from a plurality of radio bands. For example, the radio node 110 may be configured, according to example embodiments of the disclosure, to receive and/or transmit radio signals in a CBRS radio band. The radio node 110 may further be configured to receive and/or transmit radio signals in a primary radio band, such as the B66 radio band. The radio node 110 may still further be configured to receive and/or transmit radio signals in a supplementary downlink (SDL) radio band, such as the B46 radio band. The radio bands described herein are example radio bands, and according to example embodiments of the disclosure, the radio node 110 and/or the UEs 120 may be configured to communicate via a variety of other radio bands.

The radio link that may be established between the UE 120 and the radio node 110 may support any variety of communications protocols and/or communications generations, such as third generation (3G), fourth generation (4G), long-term evolution (LTE), fifth generation (5G), 5G new radio (5G NR), any variety of millimeter wave standards, or the like.

The radio communications system 112 may be configured to determine which of the UEs 120 are to be allocated to which of the radio bands for establishing radio links, both uplink and downlink, with the radio node 110. The radio communications system 112 may consider a variety of factors, such as the distance of a particular UE 120 from the radio node 110, and the antennas thereon, to determine which radio band(s) are to be allocated for uplink and/or downlink traffic to that UE 120.

In example embodiments, if the radio communications system 112 determines that a particular UE 120 is relatively close to the radio node 110, such as in a near cell, as illustrated within boundary 130, and if radio bands in the B66, B46, and the CBRS band are available for use and there are no required minimum QoS requirements, then the particular UE 120 may be allocated to the B46 band for downlink and CBRS for uplink. Alternatively, the radio communications system 112 may allocate the particular UE 120 to the CBRS band for both uplink and downlink, in other example embodiments. In some cases, if the particular UE 120 is expected to use a relatively high amount of downlink bandwidth, such as for streaming media, then the particular UE 120 may be allocated, by the radio communications system 112, to the B46 band for downlink and CBRS for uplink. On the other hand, if the particular UE 120 is not expected to use a relatively high amount of downlink bandwidth, then the particular UE 120 may be allocated to the CBRS band for both uplink and downlink traffic. As an example, UE 120(2) is depicted within the boundary 130 and, therefore, within the near cell region of the radio node 110.

If the particular UE 120 requesting services is in a mid cell region relative to the radio node, as illustrated between the boundary 130 and a boundary 132, then that UE 120 may be allocated to the CBRS band, rather than the B46 or B66 band for communications services. UE 120(3) is depicted as located within the mid cell region between the boundary 130 and the boundary 132. Furthermore, if the particular UE 120 is located at the cell edge, as illustrated between the boundary 132 and a boundary 134, then the particular UE 120 may be allocated to the B66 (e.g., primary) band that is able to provide coverage throughout the entire area of the cell, as defined by the boundary 134. UE 120(1) is depicted as located within the cell edge region between the boundary 132 and the boundary 134.

In example embodiments, with a macro-cell, the boundary 130 may be in the range of about 100 meters (m) to about 500 m from the radio node 110, the boundary 132 may be in the range of about 200 m to about 1000 m, and the boundary 134 may be in the range of about 500 m to about 1500 m. In other example embodiments, the boundary 130 may be in the range of about 250 meters (m) to about 400 m from the radio node 110, the boundary 132 may be in the range of about 450 m to about 800 m, and the boundary 134 may be in the range of about 850 m to about 1000 m. As a non-limiting example boundary 130 may be at about 333 m from the radio node 110, boundary 132 may be at about 667 m from the radio node 110, and boundary 134 may be at about 1000 m from the radio node 110.

In example embodiments, with a micro-cell, the boundary 130 may be in the range of about 50 meters (m) to about 300 m from the radio node 110, the boundary 132 may be in the range of about 150 m to about 450 m, and the boundary 134 may be in the range of about 400 m to about 700 m. In other example embodiments, the boundary 130 may be in the range of about 100 meters (m) to about 200 m from the radio node 110, the boundary 132 may be in the range of about 200 m to about 350 m, and the boundary 134 may be in the range of about 400 m to about 600 m. As a non-limiting example boundary 130 may be at about 167 m from the radio node 110, boundary 132 may be at about 333 m from the radio node 110, and boundary 134 may be at about 500 m from the radio node 110.

Although three separate regions (e.g., near cell region, mid cell region, and cell edge region) are depicted in FIG. 1, it should be understood that there may be any number of partitions of the cell associated with the radio node 110, according to example embodiments of the disclosure. For example, in some cases, there may be two separate regions of the cell. In other cases, there may be four separate regions of the cell. Regardless of the number of regions associated with the cell, the allocation of radio bands to a particular UE 120 may be based on comparing the distance of that UE 120 from the radio node 110 to one or more threshold levels.

In some example embodiments, the radio communications system 112 may determine the location of the UE 120 that is trying to establish a radio connection to the radio node 110 using signal strength. For example, if the UE 120 is sending a signal to the radio node 110 to establish a radio connection, the strength of that signal may be used to determine whether the UE 120 is in a near cell region, mid cell region, or a cell edge region. Thus, in some example embodiments, the radio communications system 112 may use a measure of signal strength, such as received signal strength indicator (RSSI) level, of a received signal from a particular UE 120, and compare that signal strength to one or more threshold levels to determine a radio band in which to allocate that particular UE 120. In other example embodiments, the radio communications system 112 may use location data, such as global positioning system (GPS) data to determine the location of the particular UE 120 relative to the radio node 110 and use that data to allocate the particular UE 120 to a particular radio band.

In further example embodiments, the radio communications system 112 may be configured to allocate a UE 120 to a particular radio band based at least in part on the availability of that radio band. For example, if a particular radio band is congested or all of its channels are being used by other UEs 120 to connect the mobile communications network, then new UEs 120 to which radio links are to be established would be allocated to radio bands where channels are available for a radio connection.

In still other example embodiments, the radio communications system 112 may be configured to determine the type of services to be rendered to a UE 120 that is to connect via a radio link to the mobile network cell and its radio node 110. For example, certain service may be contractually, or otherwise, provided a higher QoS than other services. In some cases, voice call services may be provided at a relatively higher quality of service than other types of services provided by the MNO associated with the radio communications system 112. Thus, if a UE 120 is trying to place or receive a voice call, then the radio communications system 112 may allocate that UE 120 to a primary band, such as B66, to ensure a relatively high level of service quality. In further cases, SMS message services may be provided at a relatively higher quality of service than other types of services provided by the MNO associated with the radio communications system 112. Thus, if a UE 120 is trying to send and/or receive an SMS message, then the radio communications system 112 may allocate that UE 120 to a primary band, such as B66, to ensure a relatively high level of service quality. On the other hand, if a UE 120 to download large files, and such data services are not subject to the same relatively high QoS levels as voice calls and/or SMS messages, then that UE 120 may be allocated to non-primary radio bands, such as CBRS and/or B46.

When the radio communications system 112 allocates a particular UE 120 to a particular radio band, the radio communications system 112 may indicate to the UE 120 that it has been allocated to the particular radio band. Additionally and/or alternatively, the radio communications system 112 may indicate to other entities of the mobile communications network, the allocated radio band for a particular UE 120 and the network, via the radio node 110, may establish a radio link over the allocated radio band.

In example embodiments, the radio communications system 112 may be configured to reallocate a UE 120 from one radio band to another radio band, responsive to changes in the state of the UE 120 and/or the radio node 110. For example, a UE 120 may be reallocated from one radio band to another radio band responsive to the UE 120 moving within a cell of a radio node 110, changes in the usage of the radio bands, changes in the services being used by the UE 120, and/or when the UE is handed over from one radio node 110 to another radio node 110.

Figure 2:
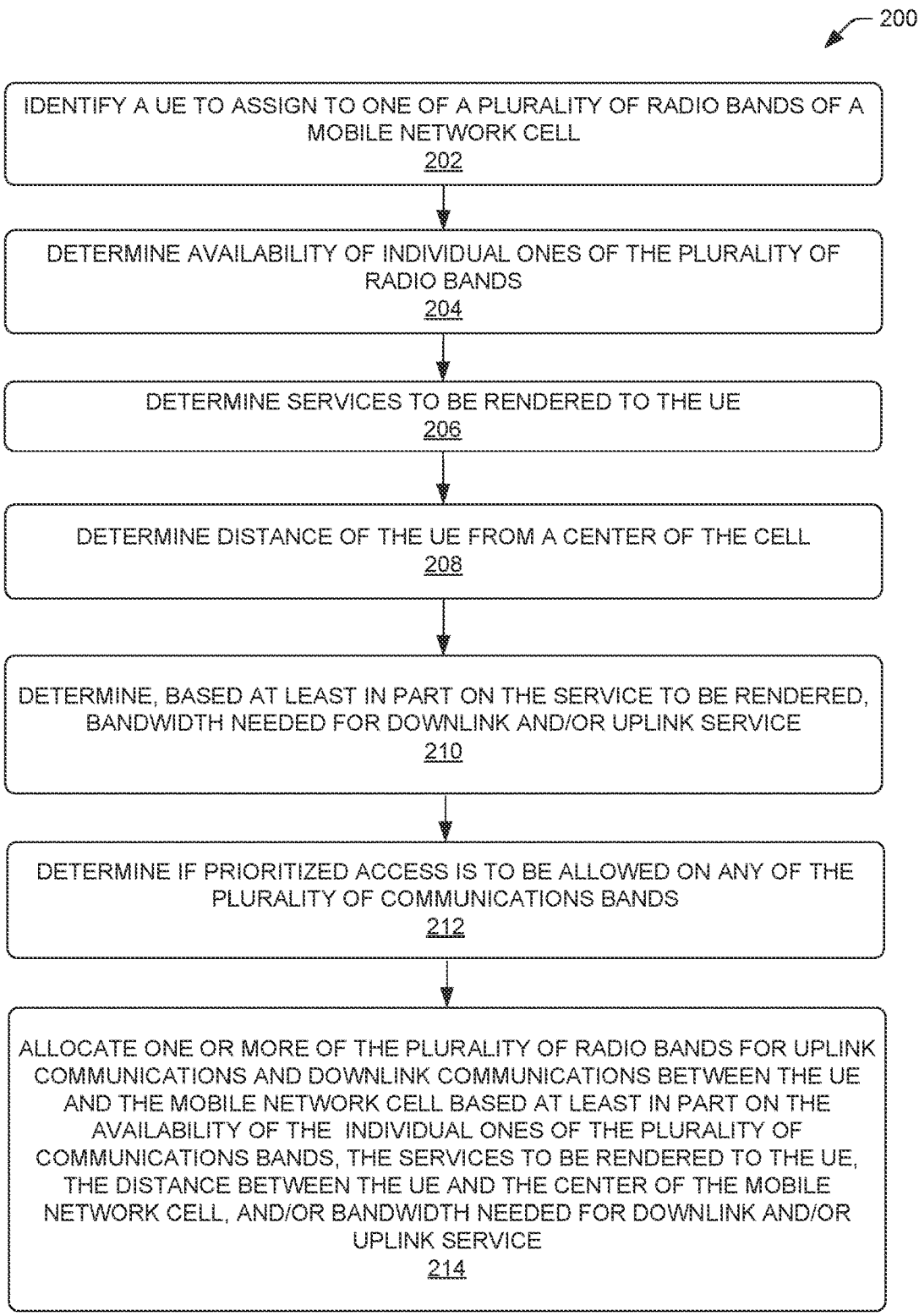
FIG. 2 illustrates a flow diagram of an example method by which a UE of FIG. 1 may be allocated to a particular radio band, in accordance with example embodiments of the disclosure.

FIG. 2 illustrates a flow diagram of an example method 200 by which a UE 120 of FIG. 1 may be allocated to a particular radio band, in accordance with example embodiments of the disclosure. The method 200 may be conducted by the radio communication system 112 in cooperation with one or more other elements of environment 100 of FIG. 1, such as UE 120.

At block 202, a UE that is to be assigned to one of a plurality of radio bands of a mobile network cell may be identified. The UE 120 may be identified by the UE 120 attempting to connect to a proximal radio node 110. For example, the UE 120 may transmit a signal, such as a beacon signal, that may be received by the radio node 110. The radio communications system 112 may be able to identify the UE 120 based at least in part on the received signal. In some cases, the signal may carry identifying information about the UE 120, such as international mobile equipment identity (IMEI) and/or international mobile subscriber identity (IMSI).

The radio bands may be any suitable radio bands. For example, any radio band that is commonly used for mobile network communications may be allocated to a UE 120 for the purpose of establishing a radio link. As described herein, one such radio band may be the CBRS radio band or band B48. In some cases, the CBRS band may have a width of approximately 150 MHz between 3.55-3.7 GHz, with 40 MHz channels and TDD that can be used for communications between the UE 120 and the radio node 110. The CBRS band may be used for uplink, downlink, or both uplink and downlink communications. In example embodiments, the various radio bands may further include an unlicensed B46 band. The B46 band may have a width of 775 MHz between 5.15-5.925 GHz, with 60 MHz channels. Alternatively, the B46 band may have other channel widths, such as 10 MHz, 20 MHz, 50 MHz, etc. In example embodiments, the B46 band may be used as a SDL channel, where the B46 band may be used only for downlink traffic to the UE 120, rather than uplink traffic from the UE 120. In other alternative embodiments, the B46 band may be used for both uplink and downlink traffic. In example embodiments, the primary, licensed band may be band B66. The B66 band may have a range of 1.71-1.78 GHz for uplink traffic and 2.11-2.2 GHz for downlink traffic, with 20 MHz channels and FDD. Although specific radio bands are discussed here, the disclosure herein contemplates other radio bands not explicitly stated herein, according to example embodiments. For example, other bands that may be allocated to UEs 120 for radio communications may include, but are not limited to, band 71 (within a range of 617-652 MHz and/or 663-698 MHz), various millimeter-wave bands, such as band 257 (within a range of 26.50-29.50 GHz), band 258 (within a range of 24.25-27.5 GHz), band 261 (within a range of 27.5-28.3 GHz), and/or band 260 (within a range of 37-40 GHz).

At block 204, an availability of individual ones of the plurality of radio bands may be identified. the primary band may be more predictably available, while B46 and/or CBRS radio bands may be congested by use that is not under the control of the MNO. For example, the CBRS band is prioritized for military use. Thus, the CBRS band may not be available or may be subject to limited availability if it is being used by prioritized entities, such as the military. In example embodiments, the availability of the radio bands may be determined by identifying if the available channels in each of the radio bands are being used by other UEs 120. Additionally, in some example embodiments, spectral analysis of the various radio bands may be examined to determine if there is spectral congestion of the various radio bands. For example, if the CBRS radio band is being used by prioritized military users, then the spectral analysis of the frequencies corresponding to the CBRS band would indicate the unavailability of channels in the CBRS radio band. In some cases, a congestion metric may be determined for individual ones of the radio bands. These congestion metrics may indicate, for example, radio channels in each radio band that may be available for use and/or a percentage of the radio band spectrum that is unavailable for use.

At block 206, service that are to be rendered to the UE may be determined. The service may be any variety of services offered to UEs 120, such as voice calls, SMS messaging, RCS, media streaming, webpage access, file download, etc. The type of communications service to be provided to the UE 120 may be determined based at least in part on signals received from the UE 120. For example, the UE120 may send signals indicating, such as when handshaking with the radio node 110, that data, rather than voice service, is requested. Different types of communications services may be given different priorities with respect to QoS. In some cases, certain communications services may have contractual agreements for a certain minimum level of QoS. For example, voice and/or SMS messaging may be given a relatively high level of QoS on mobile networks. In general, the primary band, such as B66 band, may be a relatively reliable radio band that may provide a relatively greater QoS compared to other radio bands, such as B46 and/or CBRS radio bands.

At block 208, the distance of the UE from a center of the cell may be determined. As discussed herein, the distance between the UE 120 and the radio node 110 may be determined based at least in part on signal strength of signals received from the UE 120 and/or form other location information that the UE 120 may send, such as GPS coordinates. In example embodiments, the primary band may be reliably used throughout the full range of a mobile network cell, such as all the way to the cell edge, while other radio bands, such as CBRS and/or B48 may not provide reliable signal strength all the way to the edge of the cell.

At block 210, based at least in part on the services to be rendered to the UE, a bandwidth needed for downlink and/or uplink service may be determined. For example, if a voice call is to be placed, a relatively lower, but symmetric (e.g., similar uplink and downlink data bandwidth) data bandwidth may be needed. On the other hand, if a large file is to be downloaded (e.g., file download communications service) or if media is to be streamed a relatively large amount of downlink bandwidth may be needed.

At block 212, whether prioritized access is to be allowed on any of the plurality of radio bands may be determined. In some cases, certain radio bands may have prioritized access that needs to be allowed. For example, if the CBRS radio band is being used by prioritized military users, then that access needs to be allowed unhindered and/or without any interference.

At block 214, one or more of the plurality of radio bands may be allocated for uplink communications and downlink communications between the UE and the mobile network cell based at least in part on the availability of the individual ones of the of the plurality of radio bands, the services to be rendered to the UE, the distance between the UE and the center of the mobile network cell, and/or the bandwidth needed for downlink and/or uplink service. A combination of the various factors may be considered in allocating a radio band to the UE 120. For example, if highly reliable (e.g., high QoS) service is needed, and the primary radio band (e.g., B66 band) is available, then that band may be allocated for both uplink and downlink communications traffic to the UE 120. As another example, if a high level of downlink bandwidth, but a small amount of uplink bandwidth is needed, then the UE 120 may be allocated the CBRS band for uplink communications and B46 for downlink communications. In yet another example embodiment, if the UE 120 is near the edge of a cell (e.g., relatively far away from the radio node 110), then a primary band (e.g., B66 band) may be allocated to the UE 120. In still another example embodiment, if the CBRS band is otherwise being used by reserved military use, then the UE 120 may be allocated one of either the B46 band and/or the B66 band.

When the radio communications system 112 allocates a particular UE 120 to a particular radio band, the radio communications system 112 may indicate to the UE 120 that it has been allocated to the particular radio band. Additionally and/or alternatively, the radio communications system 112 may indicate to other entities of the mobile communications network, the allocated radio band for a particular UE 120 and the network, via the radio node 110 may establish a radio link over the allocated radio band.

It should be understood that although the discussion here is in the context of a previously unconnected UE 120 connecting to a radio node 110 and being allocated a new radio band for uplink traffic and the same or different radio band for downlink traffic, example embodiments apply to UEs 120 that already have a radio link established with the radio node 110. For example, a UE 120 that is already connected to the radio node 110 may be reallocated to a new radio band, according to the processes of method 200. In example embodiments, a UE 120 may be reallocated to a new radio band if any of the variety of considerations above change. For example, if a UE 120 is allocated to the CBRS band and that band is to be cleared for military use, then the UE 120 may be reallocated to a different radio band. As another example, if a UE moves away from the radio node 110 within a cell, then the UE 120 may be reallocated to a different radio band according to its distance away from the radio node 110. As yet another example, if the nature of the services being provided to a UE 120 changes, then the UE 120 may be moved to a different radio band that is better suited for the new services. Further still, if a UE 120 with an established radio link with a radio node 110 is to be transferred to another radio node 110, the UE 120 may be allocated to a different radio band with the other radio node 110 according to the processes of method 200.

It should be noted that some of the operations of method 200 may be performed out of the order presented, with additional elements, and/or without some elements. Some of the operations of method 200 may further take place substantially concurrently and, therefore, may conclude in an order different from the order of operations shown above. It should also be noted that in some cases, there may be other components of the environment 100 involved in one or more of the operations, as described herein. In some cases, not all of the elements discussed above may be used in the allocation of the UE to a particular radio band.

Figure 3:
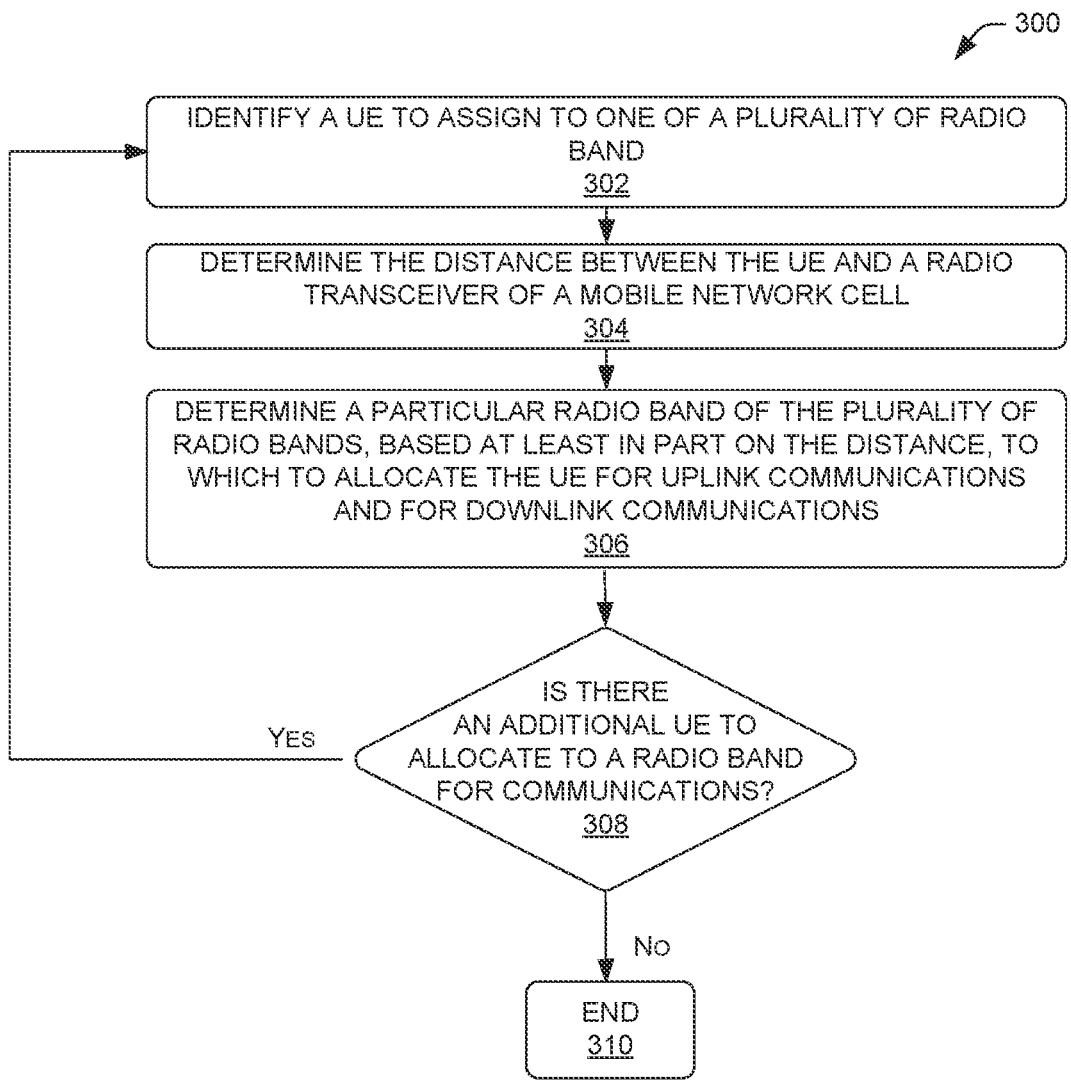
FIG. 3 illustrate a flow diagram of an example method by which mobile network cell infrastructure may allocate multiple UEs to various radio bands, in accordance with example embodiments of the disclosure.

FIG. 3 illustrate a flow diagram of an example method 300 by which mobile network cell infrastructure may allocate multiple UEs to various radio bands, in accordance with example embodiments of the disclosure. The method 300 may be conducted by the radio communication system 112 in cooperation with one or more other elements of environment 100 of FIG. 1, such as UE 120.

At block 302, a UE to assign to one of a plurality of radio bands may be identified. The UE 120 may be identified by the UE 120 attempting to connect to a proximal radio node 110. For example, the UE 120 may transmit a signal, such as a beacon signal, that may be received by the radio node 110. The radio communications system 112 may be able to identify the UE 120 based at least in part on the received signal. In some cases, the signal may carry identifying information about the UE 120, such as IMEI and/or IMSI. The radio bands may include any suitable radio band that may be used for mobile network communications. In some example embodiments, the radio bands may include the B66 band, the B46 band, and/or the CBRS band.

At block 304, the distance between the UE and a radio transceiver of a mobile network cell may be determined. As discussed herein, this distance may be based on a signal strength metric, such as RSSI, associated with a signal received from the UE 120. The signal for which signal strength may be determined may be a beacon signal, or any other suitable signal to initiate a radio link between the UE 120 and the radio node 110. Alternatively, this distance may be determined based at least in part on location data, such as GPS coordinates sent by the UE 120.

At block 306, a particular radio band of the plurality of radio bands to which to allocate the UE for uplink communications and downlink communications may be determined based at least in part on the distance. For example, the distance may be compared to various thresholds of distances associated with the range of various ones of the radio bands. Thus, if the distance is greater than a range of one of the radio bands, one of the other radio bands may be allocated to the UE 120.

At block 308, it may be determined if there is an additional UE 120 to allocate to a radio band for communications. If there is an additional UE, then the method may return to block 302 to determine the allocation of that UE 120 to a radio band. On the other hand, if there are no other UEs 120 to allocate to a radio band then the method 300 may end 310.

It should be noted that some of the operations of method 300 may be performed out of the order presented, with additional elements, and/or without some elements. Some of the operations of method 300 may further take place substantially concurrently and, therefore, may conclude in an order different from the order of operations shown above. It should also be noted that in some cases, there may be other components of the environment 100 involved in one or more of the operations, as described herein.

Figure 4:
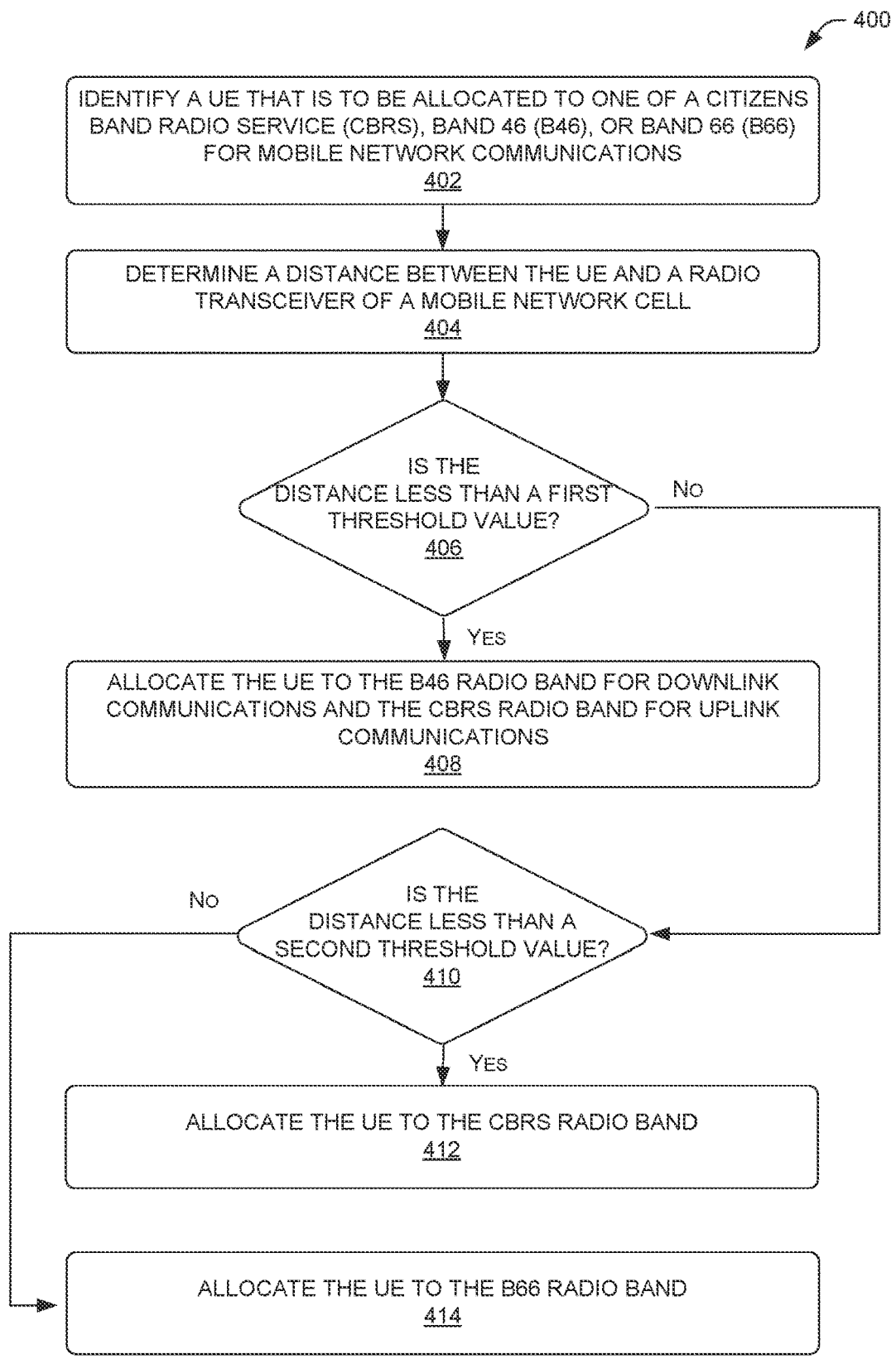
FIG. 4 illustrates a flow diagram of an example method by which mobile network cell infrastructure may allocate a UE to a radio band based at least in part on the distance of the UE from the mobile network cell infrastructure, in accordance with example embodiments of the disclosure.

FIG. 4 illustrates a flow diagram of an example method 400 by which mobile network cell infrastructure may allocate a UE 120 to a radio band based at least in part on the distance of the UE 120 from the radio node 110, in accordance with example embodiments of the disclosure. The method 400 may be conducted by the radio communication system 112 in cooperation with one or more other elements of environment 100 of FIG. 1, such as UE 120.

At block 402, it may be determined that a UE is to be allocated to one of a CBRS band, B46 band, or B66 band for mobile network communications. The UE 120 may be identified by the UE 120 attempting to connect to a proximal radio node 110. For example, the UE 120 may transmit a signal, such as a beacon signal, that may be received by the radio node 110. The radio communications system 112 may be able to identify the UE 120 based at least in part on the received signal. In some cases, the signal may carry identifying information about the UE 120, such as IMEI and/or IMSI.

At block 404, a distance between the UE and a radio transceiver of a mobile network cell may be determined. As discussed herein, the distance between the UE 120 and the radio node 110 may be determined based at least in part on a signal strength (e.g., RSSI value) of a signal received by the radio node 110 or by using a spatial indication (e.g., GPS coordinates) sent by the UE 120. In some cases, the received signal may be a beacon transmitted by the UE 120 and/or any variety of handshaking signals for establishing a connection between the UE 120 and the radio node 110. In some example embodiments, the signal strength of a signal from the UE 120 may not be explicitly translated to a distance value, by the radio communications system 112, but rather relative levels of approximate distance may be correlated to the determined signal strength. In some cases, the signal strength of the received signal may be determined at the radio node 110 by passing the received signal from the UE 120 through one or more circuits having one or more intermediate frequency (IF) mixers (e.g., superheterodyne mixers), one or more integrators and/or one or more comparators.

At block 406, it may be determined whether the distance is less than a first threshold value. This first threshold value may correspond to the boundary 130, as depicted in FIG. 1. If the distance is greater than a first threshold value, then the method 400 may proceed to block 408. At block 408, the UE may be allocated to B46 radio band for downlink communications and the CBRS radio band for uplink communications. In this case, non-primary radio bands may be used, reserving the primary band for other UEs 120, and thereby increasing the density of UEs 120 that can be served by the radio node 110 and/or reduce the cost of servicing the UEs 120. If, however, at block 406 it is determined that the distance greater than the first threshold value, then the method may proceed to block 410.

At block 410, it may be determined whether the distance is less than a second threshold value. In this case, the second threshold value may be greater than the first threshold value. If it is determined that the distance is less than the second threshold value, then at block 412, the UE may be allocated to the CBRS radio band. This second threshold value may correspond to the boundary 132, as depicted in FIG. 1. Again, in this case, non-primary radio bands may be used, reserving the primary band for other UEs 120, and thereby increasing the density of UEs 120 that can be served by the radio node 110 and/or reduce the cost of servicing the UEs 120.

If, on the other hand, the distance, at block 410, is not less than the second threshold value, then, at block 414, the UE may be allocated to the B66 radio band. This may be the primary radio band that can offer services to all locations of the cell of the radio node 110.

It should be noted that some of the operations of method 400 may be performed out of the order presented, with additional elements, and/or without some elements. Some of the operations of method 400 may further take place substantially concurrently and, therefore, may conclude in an order different from the order of operations shown above. It should also be noted that in some cases, there may be other components of the environment 100 involved in one or more of the operations, as described herein.

Figure 5:
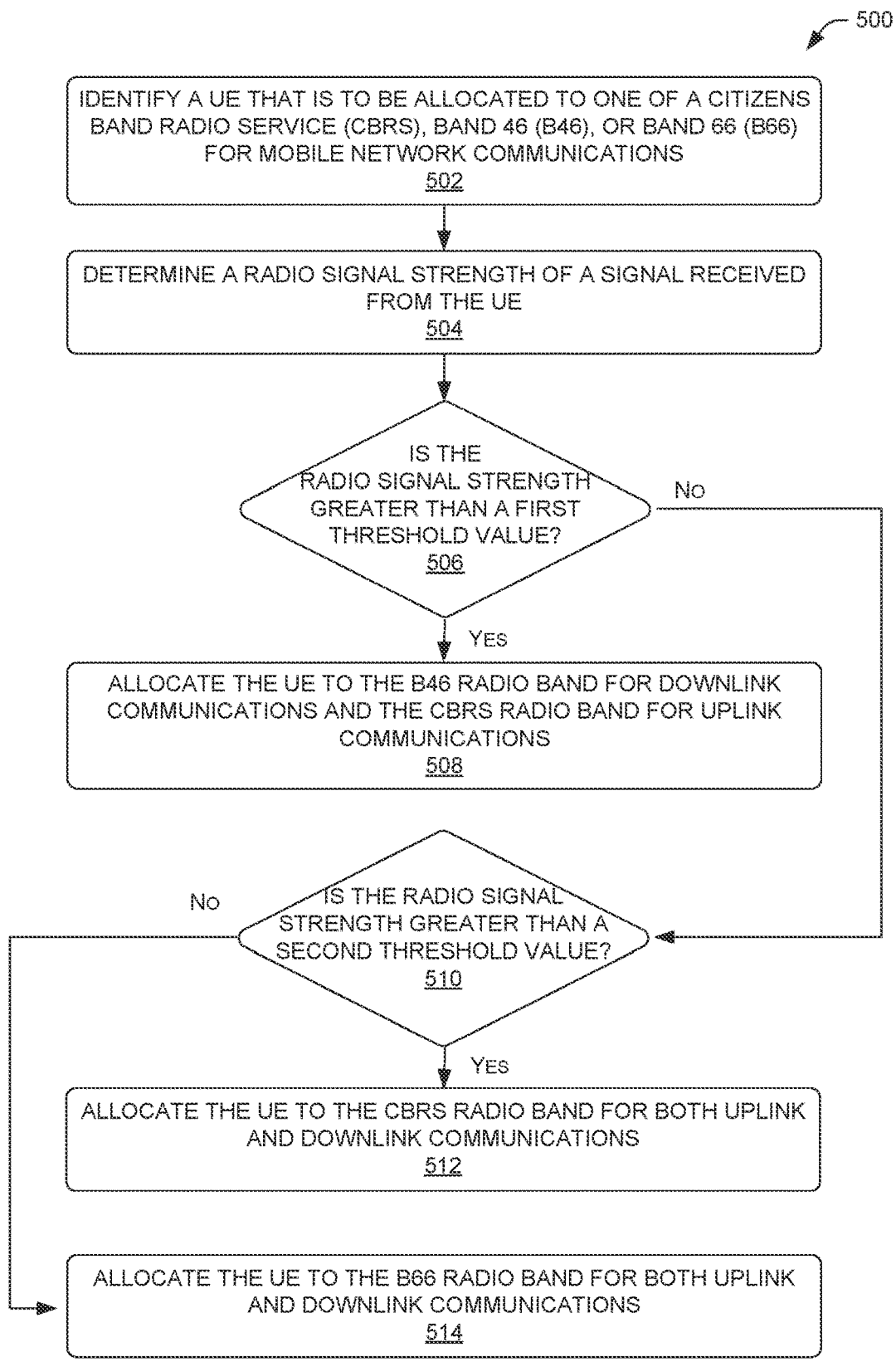
FIG. 5 illustrates a flow diagram of an example method by which mobile network cell infrastructure may allocate a UE to a radio band based at least in part on a signal strength associated with the UE, in accordance with example embodiments of the disclosure.

FIG. 5 illustrates a flow diagram of an example method 500 by which mobile network cell infrastructure may allocate a UE 120 to a radio band based at least in part on a signal strength associated with the UE 120, in accordance with example embodiments of the disclosure. The method 500 may be conducted by the radio communication system 112 in cooperation with one or more other elements of environment 100 of FIG. 1, such as UE 120.

At block 502, a UE may be identified that is to be allocated to one of a CBRS band, B46 band, or a B66 band for mobile network communications. The UE 120 may be identified by the UE 120 attempting to connect to a proximal radio node 110. For example, the UE 120 may transmit a signal, such as a beacon signal, that may be received by the radio node 110. The radio communications system 112 may be able to identify the UE 120 based at least in part on the received signal. In some cases, the signal may carry identifying information about the UE 120, such as IMEI and/or IMSI.

At block 504, a radio signal strength may be determined of a signal received from the UE. This signal strength may be any suitable signal strength metric, such as receive signal strength indicator (RSSI) or the like. In some cases, the signal strength of the received signal may be determined at the radio node 110 by passing the received signal from the UE 120 through one or more circuits having mixers, demodulators, one or more integrators, and/or one or more comparators.

At block 506, it may be determined whether the radio signal strength is greater than a first threshold value. This first threshold value may roughly correspond to the boundary 130, as depicted in FIG. 1. If it is determined that the radio signal strength is greater than the first threshold value, then the method 500 may proceed to block 508. At block 508, the UE may be allocated to B46 radio band for downlink communications and the CBRS radio band for uplink communications. If, however, at block 506 it is determined that the signal strength is less than the first threshold value, then the method may proceed to block 510.

At block 510, it may be determined whether the signal strength is greater than a second threshold value. This second threshold value may roughly correspond to the boundary 132, as depicted in FIG. 1. In this case, the second threshold value may be less than the first threshold value. If it is determined that the signal strength is greater than the second threshold value, then at block 512, the UE may be allocated to the CBRS radio band. If, on the other hand, the signal strength is not less than the second threshold value, then, at block 514, the UE may be allocated to the B66 radio band.

It should be noted that some of the operations of method 500 may be performed out of the order presented, with additional elements, and/or without some elements. Some of the operations of method 500 may further take place substantially concurrently and, therefore, may conclude in an order different from the order of operations shown above. It should also be noted that in some cases, there may be other components of the environment 100 involved in one or more of the operations, as described herein.

Figure 6:
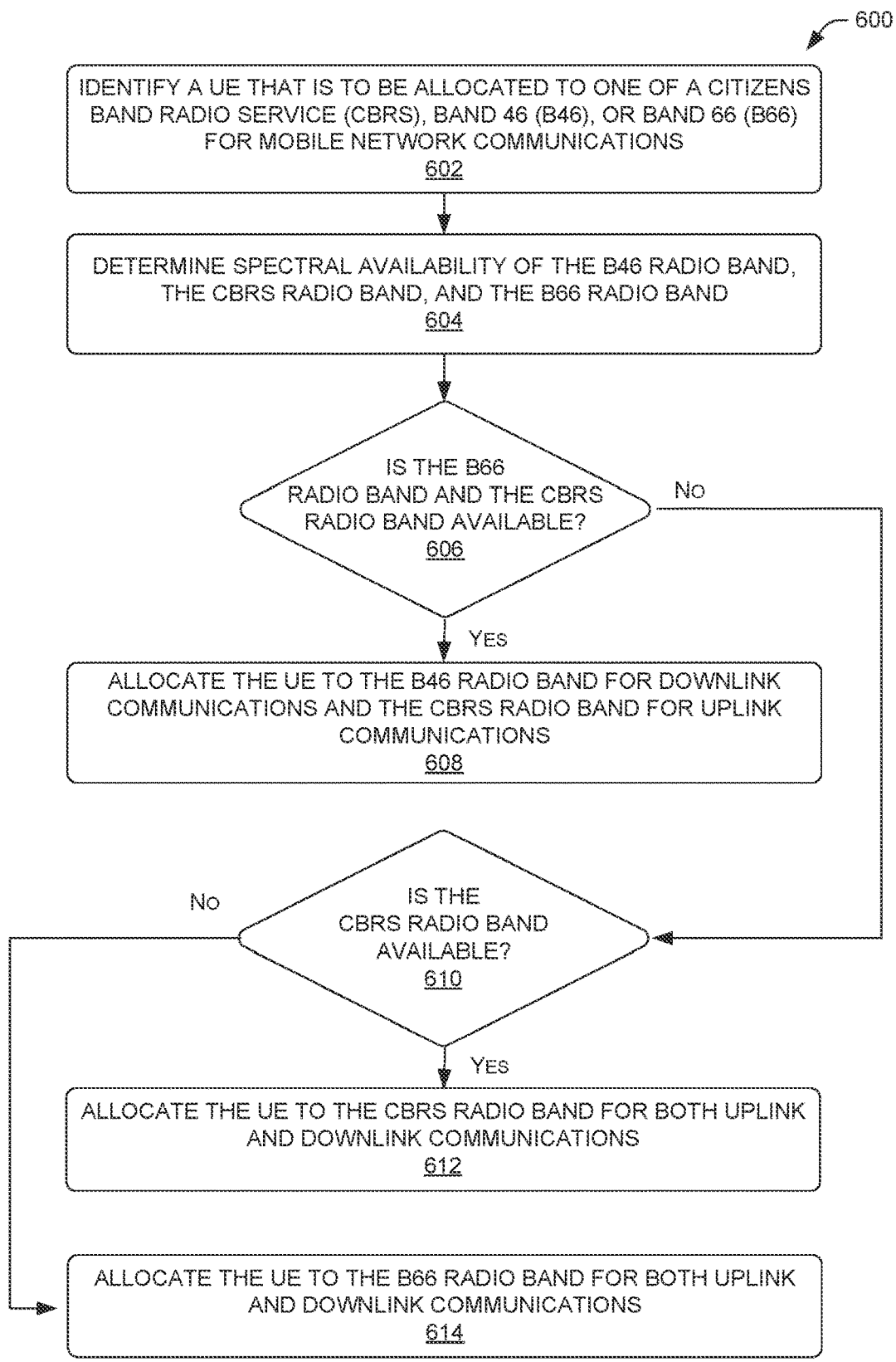
FIG. 6 illustrates a flow diagram of an example method by which mobile network cell infrastructure may allocate a UE to a radio band based at least in part on radio band availability, in accordance with example embodiments of the disclosure.

FIG. 6 illustrates a flow diagram of an example method by which mobile network cell infrastructure may allocate a UE to a radio band based at least in part on radio band availability, in accordance with example embodiments of the disclosure. The method 400 may be performed by the radio communication system 112 in cooperation with one or more other elements of environment 100 of FIG. 1, such as UE 120.

At block 602, a UE may be identified that is to be allocated to one of a CBRS band, B46 band, or a B66 band for mobile network communications. The UE 120 may be identified by the UE 120 attempting to connect to a proximal radio node 110. For example, the UE 120 may transmit a signal, such as a beacon signal, that may be received by the radio node 110. The radio communications system 112 may be able to identify the UE 120 based at least in part on the received signal. In some cases, the signal may carry identifying information about the UE 120, such as IMEI and/or IMSI.

At block 604, spectral availability of the B46 radio band, the CBRS radio band, and the B66 radio band may be determined. In some cases, the radio communications system 112 may be able to determine which radio channels are available in each of the radio bands based at least in part on tracking which UEs 120 have been allocated to various channels associated with the radio node 110. In the same or additional cases, the radio node 110 and/or the radio communications system 112 may check the spectral ranges of the various radio bands to see if any other entity is transmitting signals in those radio bands. This process may involve, in example embodiments, testing the radio bands by sweeping through the frequency range of each of the bands using a spectrum analyzer. Testing the spectral availability may allow the radio communications system 112 to detect spectral usage that is not related to its own MNO, such as spectral usage by other MNOs and/or priority usage, such as military priority usage of the CBRS band. In some cases, a congestion metric may be determined for individual ones of the radio bands. These congestion metrics may indicate, for example, radio channels in each radio band that may be available for use and/or a percentage of the radio band spectrum that is unavailable for use. These congestion metrics may be used, such as by comparing to threshold values, to identify if a radio band is available for the purposes of allocation of additional UEs 120 thereto. Alternatively, in some cases, the spectrum availability may be determined through a Spectrum Access System (SAS) that dynamically determine the availability of channels within shared bands and manages channel assignments to different MNO's base stations. SAS, or other similar systems, may be used to determine the availability of spectrum in the CBRS band and/or other shared radio bands.

At block 606, it may be determined if the B66 radio band and the CBRS radio band are available. This may be determined based at least in part on an identifying an inventory of B66 and CBRS channels already allocated, and not yet released, by other UEs 120 and/or by analyzing the spectral congestion as measured by a spectrum analyzer. If it is determined that both the B66 radio band and the CBRS radio band are available, then at block 608, the UE may be allocated to the B46 radio band for downlink communications and the CBRS radio band for uplink communications.

If, on the other hand, it is determined that the B66 radio band and the CBRS radio band are not available, at block 660, then the method 600 may proceed to block 610, where it may be determined if the CBRS radio band is available. This may be determined based at least in part on an identifying an inventory CBRS channels already allocated, and not yet released, by other UEs 120 and/or by analyzing the spectral congestion as measured by a spectrum analyzer. If it is determined that the CBRS radio band is available, then at block 612, the UE may be allocated to the CBRS radio band for both uplink and downlink communications. If, on the other hand, at block 610, it is determined that the CBRS radio band is not available, then at block 614, the UE may be allocated to the B66 radio band for both uplink and downlink communications.

It should be noted that some of the operations of method 600 may be performed out of the order presented, with additional elements, and/or without some elements. Some of the operations of method 600 may further take place substantially concurrently and, therefore, may conclude in an order different from the order of operations shown above. It should also be noted that in some cases, there may be other components of the environment 100 involved in one or more of the operations, as described herein.

Figure 7:
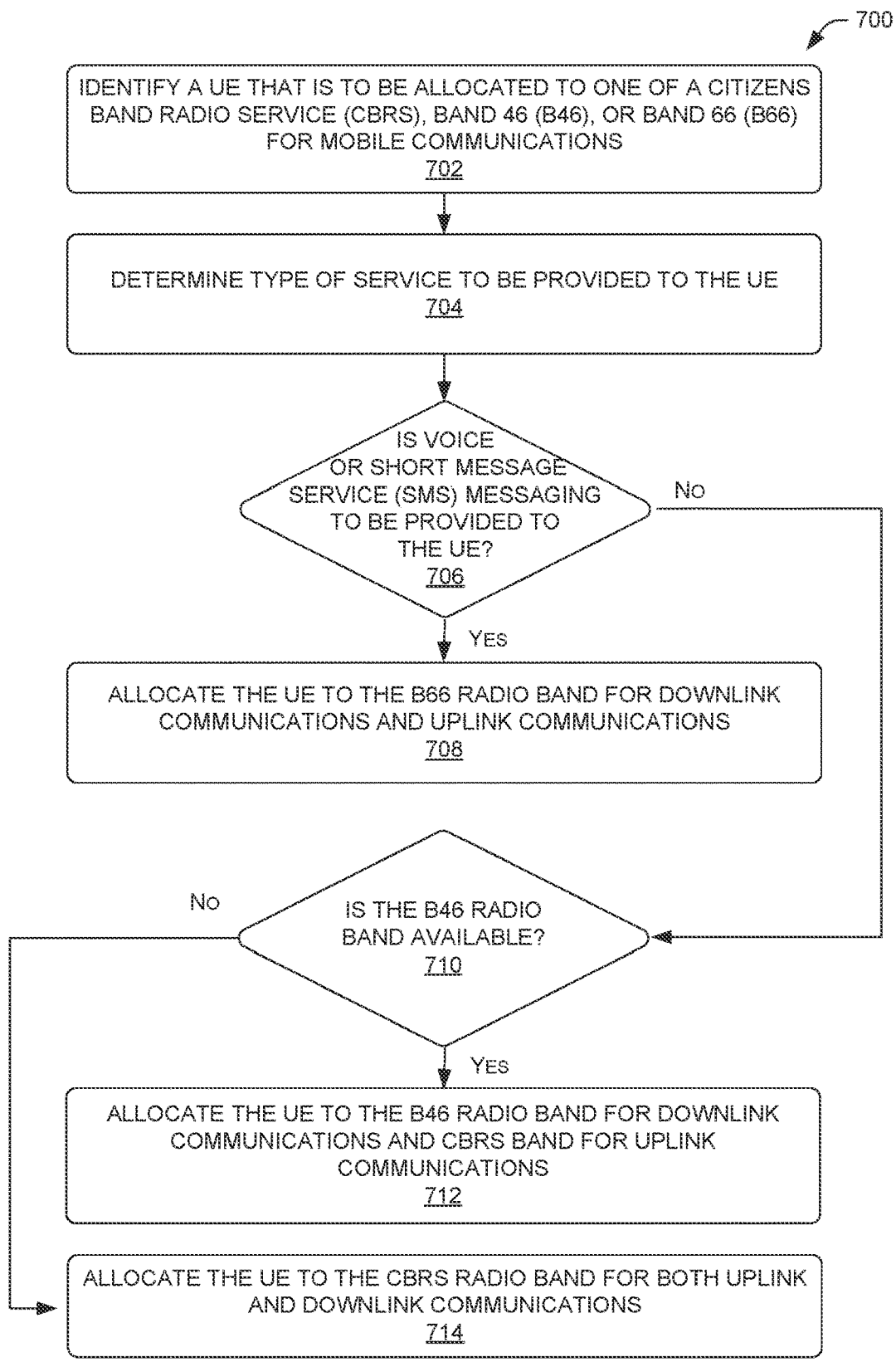
FIG. 7 illustrates a flow diagram of an example method by which mobile network cell infrastructure may allocate a UE to a radio band based at least in part on services rendered to the UE, in accordance with example embodiments of the disclosure.

FIG. 7 illustrates a flow diagram of an example method 700 by which mobile network cell infrastructure may allocate a UE to a radio band based at least in part on services rendered to the UE, in accordance with example embodiments of the disclosure.

At block 702, a UE may be identified that is to be allocated to one of a CBRS band, B46 band, or a B66 band for mobile network communications. The UE 120 may be identified by the UE 120 attempting to connect to a proximal radio node 110. For example, the UE 120 may transmit a signal, such as a beacon signal, that may be received by the radio node 110. The radio communications system 112 may be able to identify the UE 120 based at least in part on the received signal. In some cases, the signal may carry identifying information about the UE 120, such as IMEI and/or IMSI.

At block 704, the type of service to be provided to the UE may be determined. In some cases, the type of service may be determined based at least in part on messages and/or signals received from the UE 120 via the radio node 110. For example, when the UE 120 is attempting to establish a radio link, it may provide an indication of the type of communications services it may request (e.g., voice call, SMS messaging, RCS messaging, web access data, file download service, media streaming service, etc.).

At block 706, it may be determined if voice or SMS messaging is to be provided to the UE. If it is determined that voice or SMS messaging service is to be provided to the UE, then at block 708, the UE may be allocated to the B66 radio band for downlink communications and uplink communications. As a result, the highest QoS band may be provided for voice and/or SMS messaging service.

If, however, at block 706, it is determined that voice or SMS messaging services are not to be provided to the UE, then the method 700 may proceed to block 710, where it may be determined whether the B46 radio band is available. If it is determined that the B46 radio band is available, then at block 712, the UE may be allocated to the B46 radio band for downlink communications and CBRS band for uplink communications. If, however, at block 710 it is determined that the B46 radio band is not available, then at block 714, the UE may be allocated to the CBRS radio band for bother uplink and downlink communications.

Figure 8:
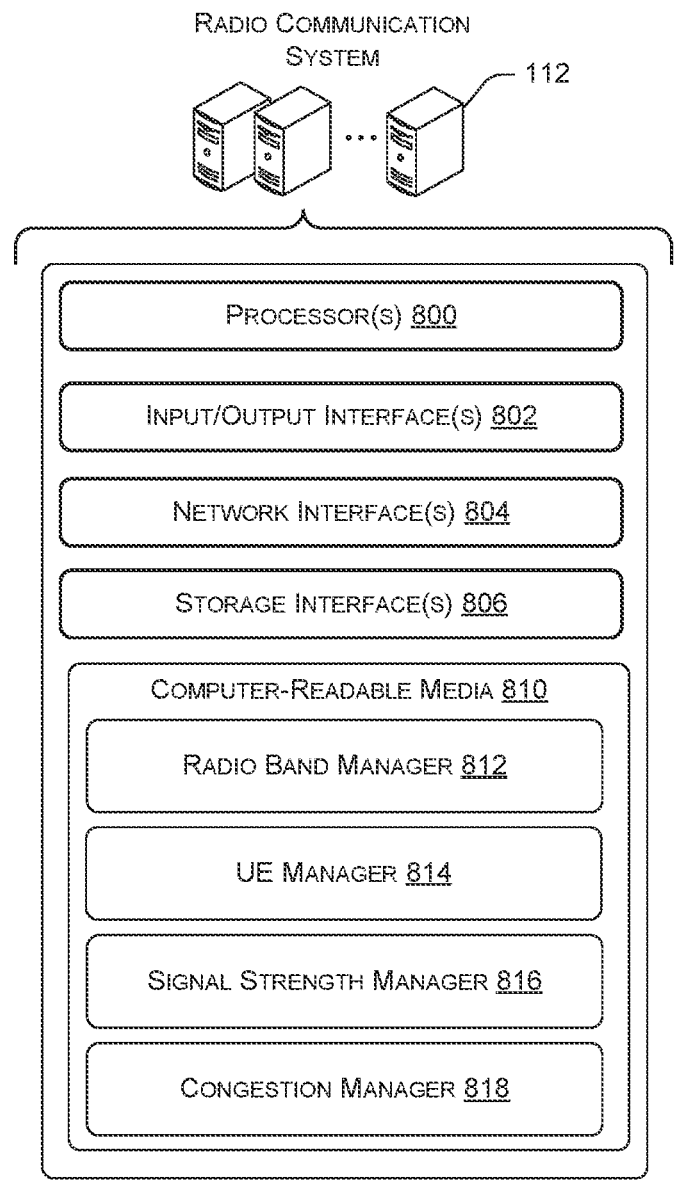
FIG. 8 illustrates a block diagram of an example radio communications system that may provide communications services and allocate UEs to various radio bands, in accordance with example embodiments of the disclosure.

FIG. 8 illustrates a block diagram of example radio communications system(s) 112 that may provide communications services and allocate UEs 120 to various radio bands, in accordance with example embodiments of the disclosure.

The radio communications system(s) 112 may include one or more processor(s) 800, one or more input/output (I/O) interface(s) 802, one or more communication interface(s) 804, one or more storage interface(s) 806, and computer-readable media 810.

In some implementations, the processors(s) 800 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 800 may possess its own local memory, which also may store program modules, program data, and/or one or more operating systems. The one or more processor(s) 800 may include one or more cores.

The one or more input/output (I/O) interface(s) 802 may enable the radio communications system(s) 112 to detect interaction with a user. For example, a user may be able to maintain, update, and/or operate the radio communications system(s) 112.

The network interface(s) 804 may enable the radio communications system(s) 112 to communicate via the one or more network(s). The network interface(s) 804 may include a combination of hardware, software, and/or firmware and may include software drivers for enabling any variety of protocol-based communications, and any variety of wireline and/or wireless ports/antennas. For example, the network interface(s) 804 may comprise one or more of a cellular radio, a wireless (e.g., IEEE 802.1x-based) interface, a Bluetooth® interface, and the like.

The storage interface(s) 806 may enable the processor(s) 800 to interface and exchange data with the computer-readable medium 810, as well as any storage device(s) external to the radio communications system(s) 112. The storage interface(s) 806 may further enable access to removable media.

The computer-readable media 810 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 810 may be implemented as computer-readable storage media (CRSM), which may be any available physical media accessible by the processor(s) 800 to execute instructions stored on the computer-readable media 810. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 800. The computer-readable media 810 may have an operating system (OS) and/or a variety of suitable applications stored thereon. The OS, when executed by the processor(s) 800 may enable management of hardware and/or software resources of the radio communications system(s) 112.

Several components such as instruction, data stores, and so forth may be stored within the computer-readable media 810 and configured to execute on the processor(s) 800. The computer readable media 810 may have stored thereon a radios band manager 812, a UE manager 814, a signal strength manager 816, and a congestion manager 818. It will be appreciated that each of the components 812, 814, 816, 818, may have instructions stored thereon that when executed by the processor(s) 800 may enable various functions pertaining to allocating radio bands to UEs 120 for establishing radio links to a radio node 110.

The instructions stored in the radio band manager 812, when executed by the processor(s) 800, may configure the radio communications system(s) 112 to identify and mange radio bands that are available to a new UE 120 that is to connect to the mobile communications network. Additionally, the radio communications system(s) 112 may plan allocations to the individual radio bands such that none of the radio bands are fully used for future use.

The instructions stored in the UE manager 814, when executed by the processor(s) 800, may configure the radio communications system(s) 112 to identify, such as by IMEI and/or IMSI, UEs 120 that are to be allocated to a radio band. Additionally, the radio communications system(s) 112 may reallocate UEs 120 to other radio bands in accordance with the disclosure herein.

The instructions stored in the signal strength manager 816, when executed by the processor(s) 800, may configure the radio communications system(s) 112 to determine a signal strength of a signal received from a UE 120 that is to be allocated to a radio band. For example, the signal strength may be an RSSI value. The signal strength levels can be used by the radio communications system(s) 112 to allocate the UE 120 to an appropriate radio band, as disclosed herein.

The instructions stored in the congestion manager 818, when executed by the processor(s) 800, may configure the radio communications system(s) 112 to determine if any of the radio bands are congested. The radio communications system(s) 112 may analyze any spectral data associated with each of the radio bands, such as the B66 band, the B46 band, the CBRS band, and/or any other suitable radio bands. By determining which bands are available, the radio communications system(s) 112 can allocate UEs 120 to those bands that are available. In some cases, a congestion metric may be determined for individual ones of the radio bands. These congestion metrics may indicate, for example, radio channels in each radio band that may be available for use and/or a percentage of the radio band spectrum that is unavailable for use.

Figure 9:
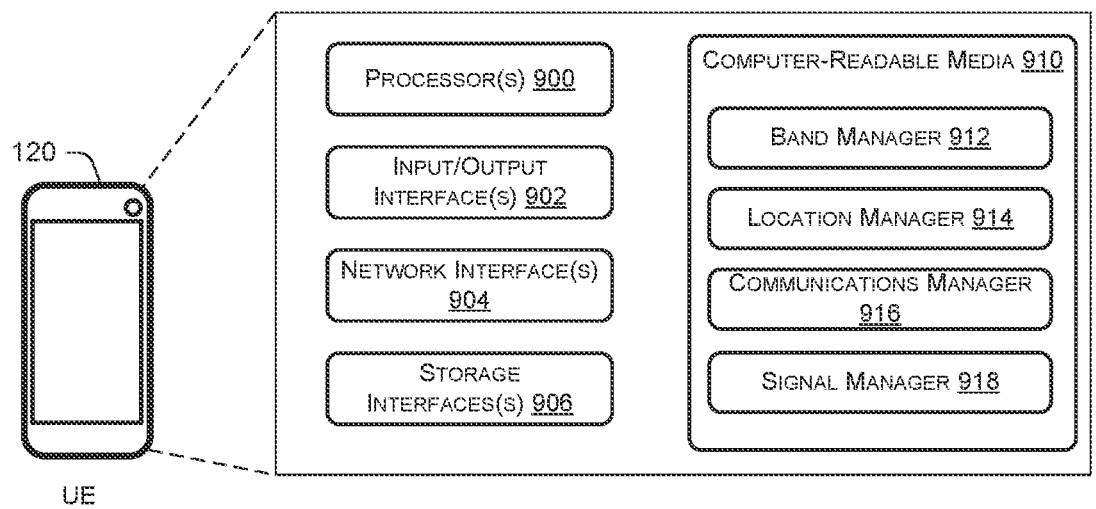
FIG. 9 illustrates a block diagram of an example UE that may be allocated to a particular radio band, in accordance with example embodiments of the disclosure.

FIG. 9 illustrates a block diagram of an example UE 120 that may be allocated to a particular radio band, in accordance with example embodiments of the disclosure.

In accordance with various embodiments disclosed herein, the terms user equipment (UE), communication device, device, wireless communication device, wireless device, mobile device, terminal, wireless terminal, mobile terminal, and client device, may be used interchangeably herein to describe the UE 120. The UE 120 may be configured for transmitting/receiving data, wirelessly and/or over wired networks, using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

The UE 120 may include one or more processor(s) 900, one or more input/output (I/O) interface(s) 902, one or more network interface(s) 904, one or more storage interface(s) 906, and computer-readable media 910. The descriptions of the one or more processor(s) 900, the one or more input/output (I/O) interface(s) 902, the one or more network interface(s) 904, the one or more storage interface(s) 906, and the computer-readable media 910 may be substantially similar to the descriptions of the one or more processor(s) 800, the one or more input/output (I/O) interface(s) 802, the one or more network interface(s) 804, the one or more storage interface(s) 806, and the computer-readable media 810, respectively, as described in FIG. 8 with respect to the radio communications system(s) 112, and in the interest of brevity, will not be repeated here.

Several modules such as instruction, data stores, and so forth may be stored within the computer-readable media 910 and configured to execute on the processor(s) 900. The computer readable media 910 may have stored thereon a band manager 912, a location manager 914, a communication manager 916, and a signal manager 918. It will be appreciated that each of the modules 912, 914, 916, 918, may have instructions stored thereon that when executed by the processor(s) 900 may enable various functions pertaining to the operations of the UE 120.

The instructions stored in the band manager 912, when executed by the processor(s) 900, may configure the UE 120 to receive information about which radio band to use to communicate with a radio node 110. The UE 120 may establish a radio link with the radio node 110 using the allocated to it for establishing the radio link.

The instructions stored in the location manager 914, when executed by the processor(s) 900, may configure the UE 120 to determine its own location, such as by using GPS signals, Wi-Fi access points (AP), and/or inertial sensors (e.g., an accelerometer). The UE 120 may send this location information to the radio node 110 and/or the radio communications system(s) 112 for the purposes of allocation of a radio band to the UE 120.

The instructions stored in the communications manager 916, when executed by the processor(s) 900, may configure the UE 120 to communicate with the radio node and/or the radio communications system(s) 112. The UE 120 may further establish a data and/or command link over the radio link with the radio node 110.

The instructions stored in the signal manager 918, when executed by the processor(s) 900, may configure the UE 120 to send and/or receive signals. Some of these signals may be beacon signals that may be used by the radio node 110 and/or the radio communications system(s) 112 to establish a signal strength metric associated with the UE 120 for allocating the UE 120 to a radio band.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
one or more processors; and
one or more non-transitory computer-readable media storing computer-executable instructions that, when executed by the one or more processors, cause the one or more processors to perform acts comprising:
receiving, from a first user equipment (UE), a first signal;
determining, based at least in part on the first signal, a first signal strength associated with the first signal;
receiving, from a second UE, a second signal;
determining, based at least in part on the second signal, a second signal strength associated with the second signal;
determining that the first signal strength is less than a first threshold value;
determining that the first signal strength is less than a second threshold value that is less than the first threshold value;
determining that the second signal strength is greater than the first threshold value;
allocating a first radio band for a first communication with the first UE based at least in part on determining that the first signal strength is less than the first threshold value, the first radio band comprising a licensed band; and
allocating a second radio band for a second communication with the second UE based at least in part on determining that the second signal strength is greater than the first threshold value.

2. The system of claim 1, wherein the second radio band comprises a band 46.

3. The system of claim 1, the acts further comprising determining, based at least in part on the second signal, that the second UE is to engage in data communications, wherein allocating the second radio band for the second communication with the second UE is further based at least in part on determining that the second UE is to engage in data communication.

4. The system of claim 1, the acts further comprising:
receiving, from a third UE, a third signal;
determining that a third signal strength associated with the third signal is greater than the second threshold value; and
allocating a third radio band for a third communication with the third UE based at least in part on determining that the third signal strength is greater than the second threshold value.

5. The system of claim 1, the acts further comprising:
receiving, from a third UE, a third signal;
determining, based at least in part on the third signal, a third signal strength associated with the third signal;
determining that the third signal strength is less than the second threshold value; and
allocating a third radio band for a third communication with the third UE based at least in part on determining that the third signal strength is less than the second threshold value, wherein the third radio band comprises a primary band and the second radio band comprises a band 46.

6. The system of claim 1, the acts further comprising determining, based at least in part on the second signal, that the second UE is to engage in voice communications, wherein allocating the second radio band for the second communication with the second UE is further based at least in part on determining that the second UE is to engage in voice communication, wherein the second radio band comprises a primary band.

7. The system of claim 1, the acts further comprising:
determining a congestion metric associated with the second radio band;
determining that the congestion metric is greater than a congestion threshold value; and
reallocating the second communication to the first radio band based at least in part on the congestion metric being greater than the congestion threshold value.

8. The system of claim 1, the acts further comprising allocating a third radio band for a third communication with the second UE, wherein the second communication is associated with a first communication service and the third communication is associated with a second communication service.

9. The system of claim 8, wherein the third radio band is a B66 radio band, and wherein the second communication service comprises voice communication.

10. A computer-implemented method, comprising:
receiving, from a first user equipment (UE), a first signal;
determining, based at least in part on the first signal, a first signal strength associated with the first signal;
receiving, from a second UE, a second signal;
determining, based at least in part on the second signal, a second signal strength associated with the second signal;
determining that the first signal strength is less than a first threshold value;
determining that the first signal strength is less than a second threshold value that is less than the first threshold value;
determining that the second signal strength is greater than the first threshold value;
allocating a first radio band for a first communication with the first UE based at least in part on determining that the first signal strength is less than the first threshold value, the first radio band comprising a licensed band; and
allocating a second radio band for a second communication with the second UE based at least in part on determining that the second signal strength is greater than the first threshold value.

11. The computer-implemented method of claim 10, wherein the second radio band comprises a band 46.

12. The computer-implemented method of claim 10, wherein the second radio band comprises a Citizens Broadband Radio Service (CBRS).

13. The computer-implemented method of claim 10, further comprising:
determining a congestion metric associated with the second radio band;
determining that the congestion metric is greater than a congestion threshold value; and
reallocating the second communication to the first radio band based at least in part on the congestion metric being greater than the congestion threshold value.

14. The computer-implemented method of claim 10, further comprising determining, based at least in part on the second signal, that the second UE is to engage in voice communications, wherein allocating the second radio band for the second communication with the second UE is further based at least in part on determining that the second UE is to engage in voice communication, wherein the second radio band comprises a primary band.

15. A non-transitory computer-readable medium having programming instructions stored thereon which, when operated by a computing device, cause the computing device to perform operations comprising:
receiving, from a first user equipment (UE), a first signal;
determining, based at least in part on the first signal, a first signal strength associated with the first signal;
receiving, from a second UE, a second signal;
determining, based at least in part on the second signal, a second signal strength associated with the second signal;
determining that the first signal strength is less than a first threshold value;
determining that the first signal strength is less than a second threshold value that is less than the first threshold value;
determining that the second signal strength is greater than the first threshold value;
allocating a first radio band for a first communication with the first UE based at least in part on determining that the first signal strength is less than the first threshold value, the first radio band comprising a licensed band; and
allocating a second radio band for a second communication with the second UE based at least in part on determining that the second signal strength is greater than the first threshold value.

16. The non-transitory computer-readable medium of claim 15, the operations further comprising determining, based at least in part on the second signal, that the second UE is to engage in data communications, wherein allocating the second radio band for the second communication with the second UE is further based at least in part on determining that the second UE is to engage in data communication.

17. The non-transitory computer-readable medium of claim 15, the operations further comprising determining, based at least in part on the second signal, that the second UE is to engage in voice communications, wherein allocating the second radio band for the second communication with the second UE is further based at least in part on determining that the second UE is to engage in voice communication, wherein the second radio band comprises a primary band.

18. The non-transitory computer-readable medium of claim 15, the operations further comprising:
receiving, from a third UE, a third signal;
determining that a third signal strength associated with the third signal is greater than the second threshold value; and
allocating a third radio band for a third communication with the third UE based at least in part on determining that the third signal strength is greater than the second threshold value.

19. The non-transitory computer-readable medium of claim 15, the operations further comprising:
determining a congestion metric associated with the second radio band;
determining that the congestion metric is greater than a congestion threshold value; and reallocating the second communication to the first radio band based at least in part on the congestion metric being greater than the congestion threshold value.

20. The non-transitory computer-readable medium of claim 15, wherein the second radio band comprises one of a band 46 or a Citizens Broadband Radio Service (CBRS).

\* \* \* \* \*